(12) United States Patent
Carpenter et al.

(10) Patent No.: US 6,477,581 B1
(45) Date of Patent: Nov. 5, 2002

(54) LOCATION/MOTION SENSITIVE COMPUTER CONNECTION

(75) Inventors: Mark Alan Carpenter, Raleigh, NC (US); David Bruce Lection, Raleigh, NC (US); Mark Edward Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 08/630,097

(22) Filed: Apr. 9, 1996

(51) Int. Cl.[7] .......................... G06F 15/173; G01S 5/14
(52) U.S. Cl. .................... 709/238; 709/227; 342/357.1
(58) Field of Search .................. 395/200.57, 200.58, 395/200.59, 200.68, 200.69, 200.7, 200.71, 200.72, 200.73, 200.74; 364/449.1, 449.7; 370/238; 342/357, 385, 357.01, 357.06, 357.1; 455/432, 433, 440, 456; 709/227, 228, 229, 238, 239, 240, 241, 242, 243, 244; 701/207, 213

(56) References Cited

U.S. PATENT DOCUMENTS

| | | | | |
|---|---|---|---|---|
| 4,907,290 A | * | 3/1990 | Crompton | 455/456 |
| 5,179,374 A | | 1/1993 | Winger | 455/440 |
| 5,216,591 A | * | 6/1993 | Nemirovsky et al | 395/200.71 |
| 5,222,249 A | * | 6/1993 | Carney | 455/456 |
| 5,253,161 A | * | 10/1993 | Nemirovsky et al. | 395/200.71 |
| 5,392,052 A | | 2/1995 | Eberwine | 342/357 |
| 5,396,540 A | | 3/1995 | Gooch | 455/456 |
| 5,396,647 A | | 3/1995 | Thompson et al. | 455/440 |
| 5,406,643 A | * | 4/1995 | Burke et al. | 395/200.73 |
| 5,504,491 A | | 4/1996 | Chapman | 342/357 |
| 5,543,789 A | * | 8/1996 | Behr et al. | 364/449.1 |
| 5,564,070 A | * | 10/1996 | Want et al. | 455/507 |
| 5,572,221 A | * | 11/1996 | Marlevi et al. | 455/440 |
| 5,581,261 A | * | 12/1996 | Hickman et al. | 342/385 |
| 5,657,317 A | * | 8/1997 | Mahany et al. | 455/433 |
| 5,659,596 A | * | 8/1997 | Dunn | 455/456 |

FOREIGN PATENT DOCUMENTS

| | | | | |
|---|---|---|---|---|
| CN | 1113643 A | 12/1995 | | H04Q/7/32 |
| EP | 0660627 | 6/1995 | | |

OTHER PUBLICATIONS

Patent Abstracts of Japan, vol. 097, No. 006, Jun. 30, 1997 & JP 09 043335 A (Sony Corp), Feb. 14, 1997.
Patent Abstracts of Japan, vol. 097, No. 004, Apr. 30, 1997 & JP 08 339337 A (Canon Inc), Dec. 24, 1996.

* cited by examiner

*Primary Examiner*—Eric W. Stamber
(74) *Attorney, Agent, or Firm*—Jeanine S. Ray-Yarletts; Marcia L. Doubet

(57) ABSTRACT

A method, data processing system and program product for providing a connection from a portable data processor to a second data processor by acquiring a geographic location of the portable data processor and selecting a connection technique and/or a connection path associated with the acquired location of the portable data processor. The portable data processor then connects to the second data processor utilizing the selected connection technique and/or connection path. The connection technique and/or connection path may be selected from a plurality of connection techniques and/or connection paths which may be prioritized.

11 Claims, 2 Drawing Sheets

LOCATION/MOTION SENSITIVE COMPUTER CONNECTION

FIELD OF THE INVENTION

The present invention relates generally to mobile computing. More particularly, the present invention relates to methods of connection for portable data processors such as laptop computers.

BACKGROUND OF THE INVENTION

In recent years, decreasing power requirements and increased performance of microprocessors has lead to increased use of portable data processors such as a laptop computers, notebook computers or personal digital assistants (PDAs). Portable data processors provide much, if not all, of the functionality of the older, immobile desktop computers but add portability as a feature. In fact, advances in display technology have made high resolution, low power, color or monochrome-displays commonplace on portable computers which has furthered the replacement of desktop systems with portable systems. As portable data processors have gained in popularity it has become more and more frequent that portable data processors have to communicate with another computer either directly or through networks. Also, this communication quite often is from a remote location with varying techniques of communication being available.

Despite the frequent need to connect a portable data processor to another processor this task has become highly complex and can be very frustrating and intimidating to all but the most advanced computer users. These techniques often involve the user knowing Internet Protocol (IP) addresses, communication protocols, modem set up information, network addresses or a multitude of telephone numbers for various dial-in devices. To further complicate the matter, not all modes of connection will be available to the portable computer user from all the varying locations in which the portable computer could be used.

As an example of the problem facing a portable computer user, when in the office a portable computer may be connected either directly to another computer through a parallel or serial cable, to a hardwired network through a Network Interface Card (NIC) or to a wireless network through a wireless network interface or to multiple types of networks such as peer-to-peer or client-server networks. Furthermore, more than one server can reside on a network and the address of the server to which the portable computer is to communicate must be selected to provide the desired access. When out of the office the portable computer could communicate with the office network through an Internet provider, directly by telephone line, by cellular telephone or by satellite telephone. In addition to knowing how to properly setup each of the communication modes and paths of connection, each-of these varying modes of communication and connection paths provide advantages and disadvantages that the user must be aware of to provide the most efficient, cost effective and reliable communication to a second computer. This is a daunting task for even experienced computer users.

At the same time that technological advances in the computer industry brought ever increasing mobility to computers, demand for increased productivity among the workforce has brought more employees in contact with computers. This contact may be in the form of a portable computer such as a notebook computer or it may be in the form of a more customized processing application such as a PDA. As described above, despite the proliferation of mobile computing among an ever less computer trained user pool, the connections for portable data processors have remained complex and difficult to set up and to customize to a particular users changing situation. Thus, there is a need for improvements in connection systems between portable data processors and a second data processor such as a network or desktop computer.

OBJECTS AND SUMMARY OF THE INVENTION

In view of the above, it is one object of the present invention to provide a simplified connection of a portable data processor to a second data processor.

An additional object of the present invention is to provide a connection which increases the likelihood that a user of a portable data processor will be able to connect to a second data processor.

It is a further object of the present invention to provide such a connection which reduces the amount of user input required to make such a connection.

Another object of the present invention is to provide a connection which is suitable for making connections between a portable data processor and a second data processor from a variety of locations and with a variety of connection techniques and connection paths.

It is yet another object of the present invention to provide a connection system which increases the performance of a portable data processor connection to a second data processor by selecting an effective connection available for the portable data processor.

In view of the objects, the present invention provides a connection from a portable data processor to a second data processor by acquiring a geographic location of the portable data processor and selecting a connection technique and/or a connection path associated with the acquired location of the portable data processor. The portable data processor then connects to the second data processor utilizing the selected connection technique and/or connection path.

In further aspects of the present invention the geographic location of the portable data processor is acquired by accepting user input specifying the location of the portable data processor. Alternatively, the geographic location of the portable data processor may be acquired by acquiring the location of the portable data processor through an automated position sensing system. In a particular embodiment of the present invention the geographic location of the portable data processor is acquired through a global positioning system.

In an additional embodiment of the present invention the portable data processor determines if it is in motion. The portable data processor then selects a connection technique and/or connection path based upon the portable data processor being in motion.

In a further embodiment of the present invention a connection technique and/or connection path is associated with an acquired location based upon the historical use of a connection technique at the specific location.

In yet another embodiment of the present invention the connection technique and/or connection path is selected from a plurality of connection techniques and/or connection paths associated with the acquired location. Furthermore, this plurality of connection techniques and/or connection paths may comprise a plurality of prioritized connection techniques and/or connection paths. In such a case the portable data processor is connected to the second data processor utilizing the highest priority connection technique and/or connection path which is capable of establishing a connection. In additional embodiments of the present invention the plurality of connection techniques and/or connection paths are prioritized based upon the data throughput performance of the connection technique and/or connection path. Alternatively, the plurality of connection techniques and/or connection paths are prioritized based upon the cost of using the connection technique and/or connection path.

As will be appreciated by those of skill in this art, the above described aspects of the present invention may also be provided as apparatus, data processing system or computer readable program means.

DETAILED DESCRIPTION

Figure 1:
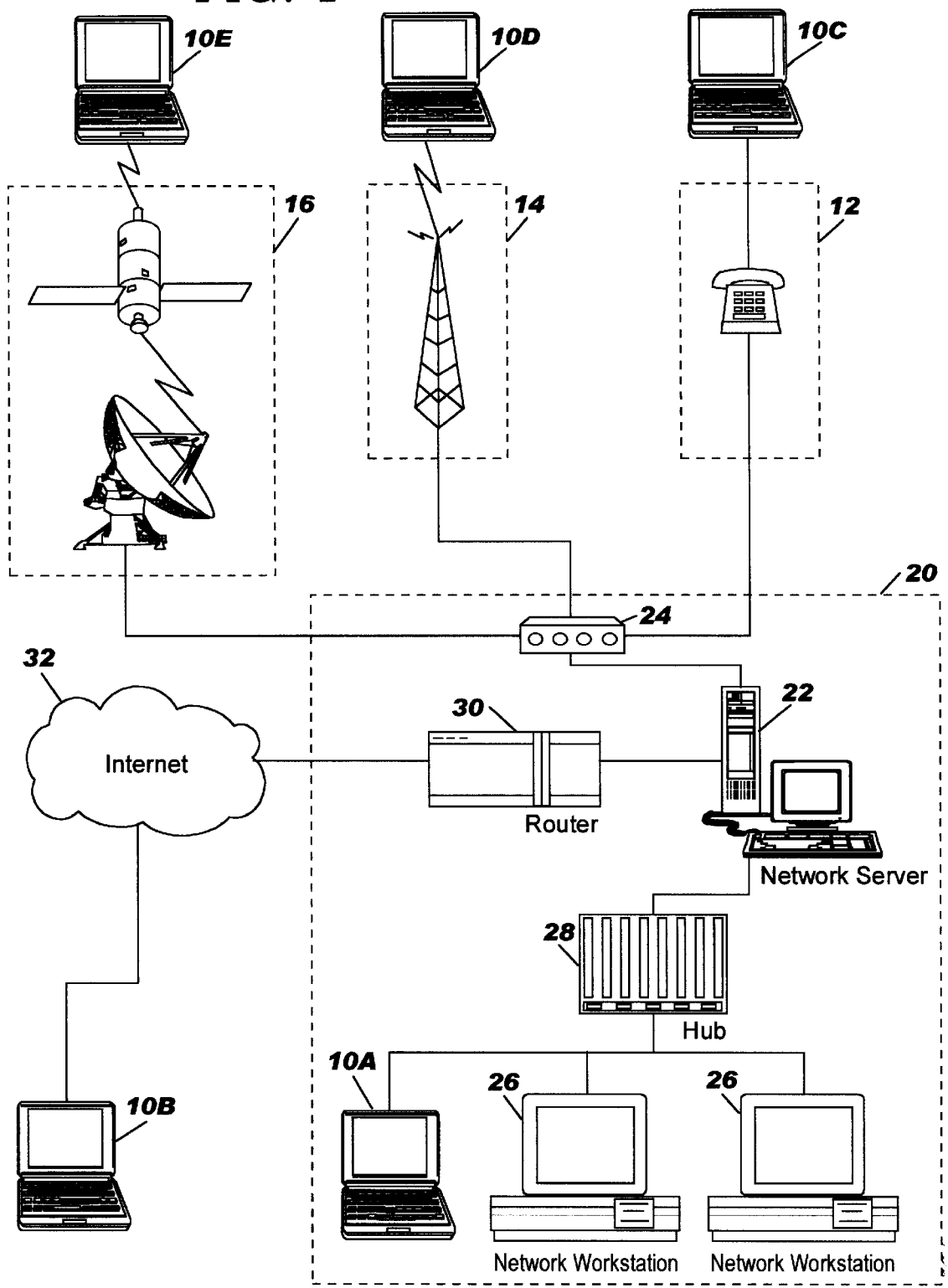
FIG. 1 is a block diagram of a system utilizing the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey-the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention provides a location sensitive connection from a portable data processor to a second data processor. The present invention relates to the two primary aspects of a connection between data processors; the connection technique and the connection path. The combination of connection technique and connection path make up a connection. Accordingly, as used herein the term "connection" shall refer to the combination of a connection technique and a connection path.

As used herein the term "connection technique" refers to the communication mode utilized for communication between processors. For example, the communication could occur over a standard analog telephone line utilizing a modem associated with the communicating data processors. Thus, the communication technique would be through standard telephone lines. As will be appreciated by one of skill in the art, any number of communication techniques can be utilized for communication between two processors. Further examples of the communication techniques contemplated by the present invention include, cellular telephone, satellite telephone, direct access to the second data processor through a-parallel or serial adapter, wireless interface to a wireless local-area-network or wide-area-network, and any of a number of network interface cards to a local or wide-area-network. While these examples may be utilized in carrying out the operations of the present invention, other techniques known to those skilled in the art for connecting two computers may be utilized.

As used herein the term "connection path" refers to the route that data takes to the second data processor. In the simplest form of direct connection between two data processors the connection technique could be by a serial cable and the connection path may be through communications port 1 (COM1). In another example, where the connection technique between two data processors is a telephone line and modem connection, the connection path would be the telephone number utilized to make the connection. In a more complicated example, where two data processors communicate over the Internet, the connection technique could be any one of a number of connection techniques while the connection path would be the Internet Protocol (IP) address of the proxy or server with which the first data processor was communicating. Thus, in the Internet example, a connection could be made to a server by telephone and the connection path would be the telephone number of the server and the IP address of the server. As will be appreciated by one of skill in the art, the connection path may vary with the connection technique but includes the "addressing" information necessary to make the connection to the second processor.

As used herein the term "portable data processor" refers to any type of portable data processor or computer having processing and communication capabilities. Examples of portable data processors would include PDA's, pen-based computers, laptop computers or dedicated processors for specific tasks such as electrical or utility meter reading or the like. Furthermore, as will be appreciated by those of skill in the art, the present invention is described with respect to a second data processor which may also be a portable data processor, or computer having processing and communication capabilities.

As described above, the present invention provides a location sensitive connection between two data processors. Several possible connections between a portable data processor and a second data processor are shown in FIG. 1. As will be appreciated by one of skill in the art, these are merely examples of possible connections and are not exhaustive of the possible connection techniques or connection paths which may be utilized in the present invention.

As illustrated in FIG. 1, the present invention may provide a connection between a portable data processor 10A such as a notebook computer and a second data processor 22. The second data processor is illustrated in FIG. 1 as a network server, however, the second data processor may be any form of data processor. In carrying out the operations of the present invention, the portable data processor 10A selects a connection technique based upon the location of the portable data processor. Thus, the portable data processor may select a connection technique suitable to the portable data processor being in a location where a network interface is available. According to the present invention the portable data processor 10A first acquires the geographic location of the portable data processor 10A and then selects a connection technique and/or connection path associated with the acquired location of the portable data processor 10A. In the present example, the portable data processor 10A would determine from the acquired geographic location that the portable data processor 10A was in a location where a connection to the local-area-network 20 was available. The portable data processor 10A would then connect to the second data processor 22 utilizing the selected connection technique, such as is illustrated by the connection of portable data processor 10A through hub 28 to the network server 22. In this example, the connection technique would be through a network interface card and the connection path would be the network address of the network server 22. However, as will be appreciated by those of skill in the art other network connections may be suitable for use with the present invention.

As a further example of the present invention, if a second data processor (such as network server 22) to which a portable data processor (such as portable data processor 10B) may be connected has available a connection path through the Internet, such as the connection of the network server 22 of the local-area-network 20 to the Internet 32 through router 30, connection from portable data processor 10B to the second data processor 22 could be made through the Internet 32. The portable data processor 10B would first acquire its geographic location and then, based on that location, connect to the Internet 32 using whatever connection technique was available for the acquired location. The connection path could then be set to the IP address of the network server 22 which has access to the Internet through router 30, or could be set to the IP address of a local proxy which would be selected based on the acquired location of the portable data processor 10B.

As a further example of one possible operation of the present invention, if portable data processor 10B acquires a location which indicates that portable data processor 10B is located in New York, then, based on the acquired location of portable data processor 10B, a connection technique and connection path could select a New York local Internet server and proxy address to allow connection to the Internet through a local service. If portable data processor 10B moves to, for example, North Carolina, and reacquires its location, then portable data processor 10B, could select a connection technique and connection path utilizing a North Carolina local Internet server and proxy address to allow connection to the Internet through a local service. Thus, the portable data processor automatically changes the connection path and technique without user intervention to allow for connection to a second computer.

Portable data processors 10C, 10D, and 10E of FIG. 1 further illustrate possible connection techniques from a portable data processor to a second data processor utilizing telephone technology. As with the previous examples, in carrying out the operations of the present invention the portable data processors 10C, 10D, and 10E would first acquire their geographic location and then select a connection technique based on that location. For example, the portable data processor 10C may be located in a hotel room remote from the network server 22 and, therefore, could dial the network server 22 over traditional telephone lines 12. The connection could then be made to the local area network 20 through modem 24 over telephone lines 12. Alternatively, if the acquired location indicated that no traditional telephone lines were available, such as traveling in a car, the portable data processor could connect using cellular telephone technology. As illustrated in FIG. 1, portable data processor 10D could connect to local-area-network 20 over a cellular link 14. Thus, the connection technique would be by cellular telephone. Finally, with respect to FIG. 1, the portable data processor 10E may be in a location where neither traditional or cellular phone service is available. In such a case, the portable data processor 10E would acquire a geographic location, for example on a ship at sea, and from that geographic location select a connection technique. In the example shown in FIG. 1, with respect to portable data processor 10E, the connection technique would be through satellite telephone service 16 and connect to local area network 20 through modem 24. In such a case the connection technique would be satellite telephone service.

In each of these examples for portable data processors 10C, 10D, and 10E, the connection technique has varied but the connection path may remain the same. Thus, if the connection technique involves accessing the modem 24 of the local area network 20 then the connection path would still include the telephone number of the modem 24.

As is illustrated above with respect to the portable data processors of FIG. 1, the portable data processors may select a connection technique based on an acquired location, may select a connection path based on an acquired location or may select both a connection path and a connection technique based on an acquired location. Furthermore, a portable data processor may choose from a plurality of connection techniques or connection paths to select the appropriate connection for the acquired geographic location and the configuration of the portable data processor. Therefore, the portable data processors 10A, 10B, 10C, 10D, and 10E may represent a single portable data processor having available a plurality of connection techniques and a plurality of connection paths which are selected based on an acquired geographic location.

The plurality of connection techniques and the plurality of connection paths may also be prioritized such that the portable data processor selects the highest priority connection technique available and the highest priority connection path available when connecting to a second data processor. Also, the user may be prompted for input as to the priority of the connection technique or connection path if no preloaded prioritized connection information is available. The connection technique and connection path may be prioritized based upon throughput performance, cost of using the connection technique or path, or security of the connection technique or path. As will be appreciated by those of skill in the art other ways of prioritizing a plurality of connection techniques or plurality of connection paths may be employed while still benefiting from the teachings of the present invention.

The present invention is based upon the acquisition of the geographic location of a portable data processor. Many techniques are available for acquisition of the geographic location of a portable data processor. The technique selected for a particular application will depend upon the resolution required for the application and the amount of location sensing infrastructure which is justifiable for the particular application. For example, an extensive infrastructure exists which allows a portable data processor to determine its location on the face of the earth through global positioning satellite systems. However, if the location resolution required for a particular application is higher than available from a global positioning system, more refined methods of acquiring the portable data processor's location may be necessary.

One technique for acquiring the geographic location of the portable data processor is by accepting user input specifying the location of the portable data processor. For example, a user may be prompted to input the location of the portable data processor or to select the portable data processor location from a list of possible locations. This system may have cost advantages. Depending on the resolution required for the location of the portable data processor, the acquisition of the location may be automated using an automated position sensing system such as the Global Positioning System or GPS. GPS cards are readily available for laptop or notebook computers and provide locations of the computer within about 10 feet for civilian applications with even greater resolution for military applications. In the event that higher resolution of the geographic location of the portable data processor is required, specific automated position sensing systems may be implemented at a particular location. Various methods of accurately determining the position or location of a portable data processor are known to those of skill in the art. Examples of these methods include radio frequency (RF) or infrared (IR) transmitters located at specific locations and an RF or IR receiver associated with the portable data processor. In addition to acquiring the two-dimensional location of a portable data processor, the geographic location may also include the three dimensional location of the portable data processor, which would include an altitude or depth component. Thus, a user interface could be selected based upon the portable data processor being on a particular floor of a building, an altitude in the air or a depth below the sea.

To minimize the amount of user training required to operate systems utilizing the present invention, the association of connection techniques or connection paths with geographic locations as well as the prioritization of connection techniques and connection paths may be preloaded in the portable data processor by a system administrator. Alternatively, for more advanced users the association of a connection technique or connection path with a location may be created or modified by the user to further increase the usability of the user interface. In a more automated embodiment of the present invention, the connection technique or connection path associated with a geographic location may be created automatically based upon historical use of connection techniques or connection paths at a geographic location. For example, the use of a cellular link to a dial-in server from an airport could be recorded and, if used often enough at that location, the connection technique and connection path associated with the airport location could be updated to increase the priority of the cellular link and the dial-in server within the plurality of connection techniques and connection paths available. Additionally, if the portable data processor has access to information which categorizes geographic locations, such as the geographic locations of all airports in the United States, the user could be asked if they would like the connection technique and connection path to also be selected for all geographic locations of the same type. Thus, the connection path or connection technique associated with various locations may be dynamically configured automatically through user input or through a combination of user input and automation.

In addition to dynamically configuring the connection technique and/or connection path based on location, the priority of a connection technique and/or connection path can be dynamically configured to increase the priority of successful connection techniques and/or connection paths associated with a location. Thus, for example, if a high priority connection path is unsuccessful at making a connection to a second data processor, then that connection path could be reduced in priority. Alternatively, the user could be informed of the unreliability of the connection path and be requested to confirm that its priority should be reduced.

By acquiring the location of the portable data processor over time it is possible for the portable data processor to determine if the portable data processor is in motion. In fact, if the frequency of acquisition of the geographic location of the portable data processor is high enough it is even possible to determine the approximate velocity or acceleration of the portable data processor when it is in motion. For example, if the portable data processor automatically acquires its location every 5 seconds, then the processor may calculate the difference in location and divide that distance by the 5 second acquisition interval to determine the processor's approximate velocity. Through successive determinations of velocity the acceleration of the portable data processor may also be obtained.

Velocity or acceleration information can be used to select a connection technique or a connection path, or even to prevent or reprioritize connection techniques or connection paths, based upon the portable data processor being in motion and could even be used to determine the approximate mode of transportation being utilized. For example, if the processor determines that its velocity is greater than 300 miles per hour or 500 kilometers per hour then it could safely assume that the portable data processor was traveling in an airplane. The portable data processor could then prevent access to portable telephone type connection techniques which are prohibited for use on an airplane and could select a Skyphone™ or other type of Federal Aviation Administration acceptable communication method.

Likewise, a combination of location and velocity could be used to select a connection technique or connection path. For example, a velocity of 20 miles per hour or 33 kilometers per hour combined with a location indicating the portable data processor was over water could be used to select a connection technique or connection path suitable for a boat or ship. As will be appreciated by one of skill in the art, numerous other combinations of velocity, location or acceleration could be used to select an appropriate connection technique or connection path associated with the situation having those characteristics.

Figure 2:
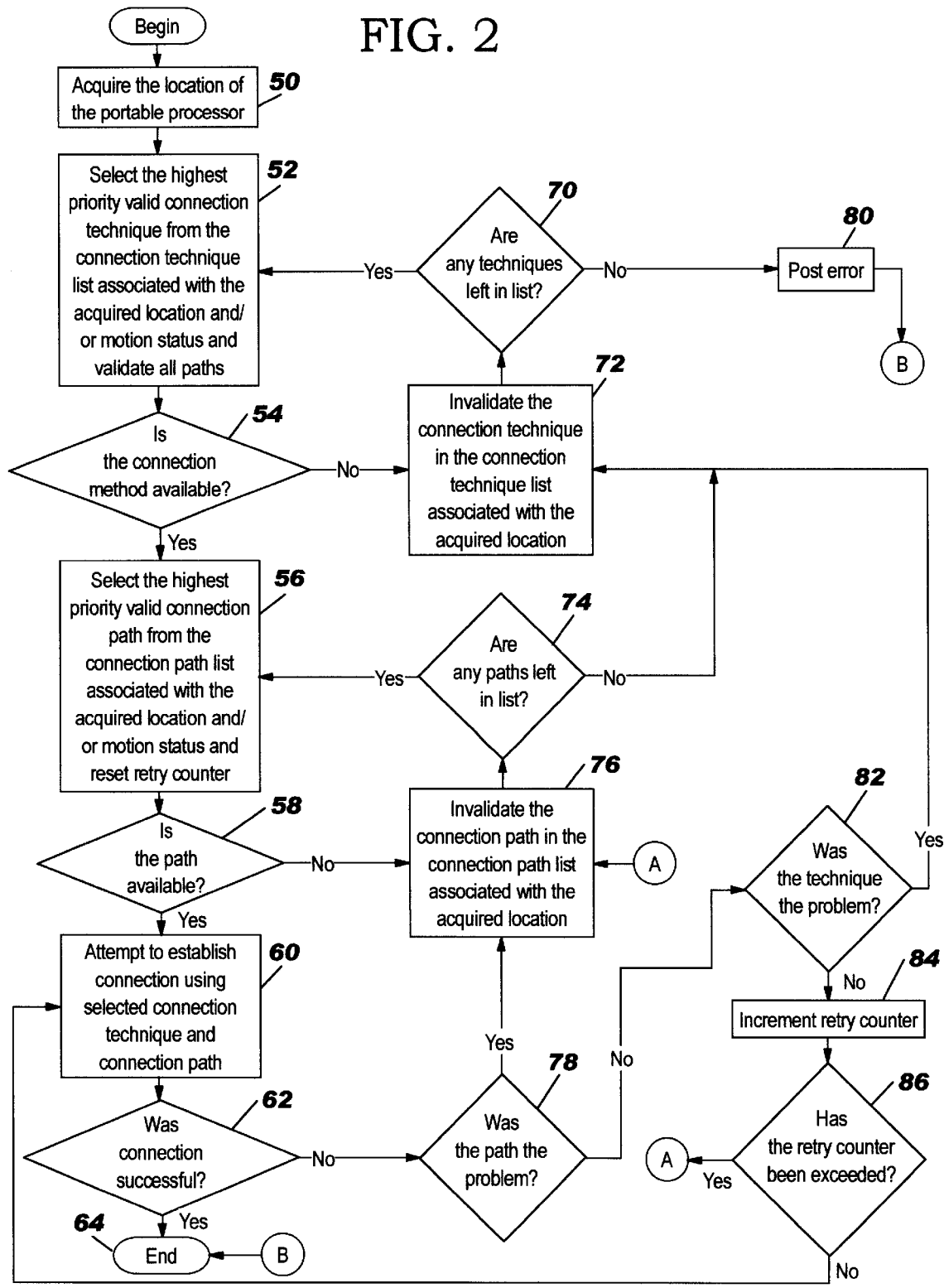
FIG. 2 is a flow chart of an embodiment of the present invention.

One particular embodiment of the present invention will now be described with reference to FIG. 2. The operations of the present invention begin with a portable data processor acquiring its geographic location as reflected in block 50. The portable data processor then selects the highest valid priority connection technique from a list of connection techniques associated with the acquired location. The portable data processor also validates all of the connection paths associated with the acquired location. These operations are reflected in block 52.

After selecting a connection technique, as shown in block 54, the portable data processor determines if the connection technique is available. For example, if the connection technique selected was by telephone line then the portable data processor could test to see if a telephone line is connected to the portable data processor. If the connection technique is available, then the portable data processor selects the highest priority valid connection path from a list of connection paths associated with the acquired location, as seen in block 56. The portable data processor also resets a retry counter for the selected connection path. The portable data processor then determines if the connection path is available for the selected connection technique, as shown in block 58, and then attempts to make the connection to the second data processor utilizing the selected connection technique and connection path, as shown in block 60. If the connection to the second data processor was successful then the portable processor ends the connection routine as reflected in block 64.

Returning to block 62, if the connection was not successful then the portable data processor attempts to determine if the problem was with the connection path selected, as shown in block 78. As seen in block 82, if the portable data processor cannot determine if the path was the problem or if it can determine that the path was not the problem then the portable data processor attempts to determine if the connection technique was the problem. If the portable data processor cannot determine that the connection technique was the problem or if the portable data processor determines that the connection technique was not the problem then the portable data processor increments the retry counter, as shown in block 84. As reflected in block 86, the portable data processor then determines if a user defined retry count has been exceeded. If the retry count has not been exceeded, then the portable data processor returns to block 60 and again attempts to establish the connection.

If the retry count has been exceeded then the portable data-processor invalidates the connection path in the connection path list associated with the acquired location, as shown in block 76. The portable processor then, as shown in block 74, checks to see if any valid connection paths are left in the connection path list. If there is at least one valid connection path left in the connection path list associated with the acquired location then the portable data processor returns to block 56 and again selects the highest valid connection path associated with the acquired location from the connection path list. The portable data processor then continues from block 56 as described above.

Returning to block 54, if the selected connection technique is not available, then the portable data processor invalidates the connection technique in the connection technique list associated with the acquired location, as reflected in block 72. As seen in block 70, the portable data processor then determines if any valid connection techniques remain in the connection technique list. If no valid connection techniques remain in the connection technique list, then the portable data processor ends the routine with an error, as shown in block 80, and may notify the user that a connection could not be established. Alternatively, if the connection technique is not available, then the portable data processor could prompt the user to take action to make the connection technique available. In such a case if the user made the connection technique available then the portable data processor would not invalidate the connection technique but would return to block 56 and select the highest priority path as described above. If at least one valid connection technique remains in the connection technique list, then the portable data processor returns to block 52 and selects the highest priority valid connection technique from the connection technique list associated with the acquired location and validates all connection paths in the connection path list.

Returning to block 74, if the portable data processor determines that no valid connection path remains in the connection path list associated with the acquired location, then all of the connection paths available for a connection technique have been unsuccessful and the portable data processor invalidates the connection technique as shown in block 72. The portable data processor then carries out the operations described above after invalidating a connection technique.

Returning to block 58, if the portable data processor determines that a selected connection path is not available for a connection technique, then the portable data processor invalidates that connection path in the connection path list as shown in block 76. The portable data processor then carries out the operations associated with invalidating a connection path as described above.

Returning to block 78, if the portable data processor determines that a connection attempt fails because of the connection path, then the portable data processor invalidates that connection path in the connection path list as shown in block 76. The portable data processor then carries out the operations associated with invalidating a connection path as described above.

Returning to block 82, if the portable data processor determines that a connection attempt fails because of the connection technique, then the portable data processor invalidates that connection technique in the connection technique list as shown in block 72. The portable data processor then carries out the operations associated with invalidating a connection technique as described above.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

What is claimed is:

1. A method of providing a connection from a portable data processor to a second data processor, the method comprising:
    acquiring a geographic location of the portable data processor;
    determining if the portable data processor is in motion, and if so, determining a velocity at which said portable data processor is moving;
    selecting a connection technique from one or more connection techniques associated with said acquired geographic location and said determined velocity when said determining step determines that the portable data processor is in motion;
    selecting a connection path from one or more connection paths associated with said selected connection technique, said acquired geographic location, and said determined velocity when said determining step determines that the portable data processor is in motion; and
    connecting the portable data processor to the second data processor utilizing the selected connection technique and the selected connection path.

2. A method according to claim 1 wherein said acquiring step comprises the step of accepting user input specifying the geographic location of the portable data processor.

3. A method according to claim 1 wherein said acquiring step comprises the step of acquiring the geographic location of the portable data processor through an automated position sensing system.

4. A method according to claim 1 wherein said acquiring step comprises the step of acquiring the geographic location of the portable data processor through a global positioning system.

5. The method according to claim 1, wherein said determined velocity prevents said selecting steps from selecting particular ones of said connection techniques and connection paths.

6. A data processing system for providing a connection to a second data processor, the data processing system comprising:
    a portable data processor;
    means for acquiring a geographic location of said portable data processor;
    means for determining if said portable data processor is in motion, and if so, determining a velocity at which said portable data processor is moving;
    means for selecting a connection technique from one or more connection techniques associated with the acquired geographic location and said determined velocity of said portable data processor when said means for determining determines that said portable data processor is in motion;

means for selecting a connection path from one or more connection paths associated with the selected connection technique, the acquired geographic location of said portable data processor, and the determined velocity of the portable data processor when said means for determining determines that said portable data processor is in motion; and means for connecting said portable data processor to said second data processor utilizing the selected connection technique and the selected connection path.

7. A data processing system according to claim 6 wherein said means for acquiring comprises means for acquiring the geographic location of said portable data processor through an automated position sensing system.

8. A data processing system according to claim 6 wherein said means for acquiring comprises means for acquiring the geographic location of said portable data processor through a global positioning system.

9. A data processing system according to claim 6 wherein said means for acquiring comprises means for acquiring the geographic location of said portable data processor through a global positioning system.

10. A method of providing a connection from a portable data processor to a second data processor, the method comprising stops of:

recording each usage, by the portable data processor, of each of a plurality of connection techniques at one or more geographical locations;

acquiring a current geographic location of the portable data processor;

determining, based upon relative frequency of the recorded usages, which of the connection techniques has a highest historical usage by the portable data processor at the acquired current geographic location;

selecting the connection technique determined to have the highest historical usage at the acquired geographic location;

selecting a connection path from one or more connection paths associated with said selected connection technique; and connecting the portable data processor to the second data processor utilizing the selected connection technique and the selected connection path.

11. A data processing system for providing a connection to a second data processor, the data processing system comprising:

a portable data processor;

means for recording each usage, by the portable data processor, of each of a plurality of connection paths at one or more geographical locations;

means for acquiring a current geographic location of the portable data processor;

means for determining, based upon relative frequency of the recorded usages, which of the connection paths has a highest historical usage by the portable data processor at the acquired current geographic location;

means for selecting a connection technique from one or more connection techniques associated with said acquired current geographic location;

means for selecting the connection path determined to have the highest historical usage at the acquired geographic location; and means for connecting the portable data processor to the second data processor utilizing the selected connection technique and the selected connection path.

* * * * *